(12) United States Patent
Beshenar et al.

(10) Patent No.: US 7,116,659 B2
(45) Date of Patent: Oct. 3, 2006

(54) DATA TRANSMISSION MEMORY

(75) Inventors: Jurij Beshenar, Munich (DE); Mathias Hellwig, Buchloe (DE)

(73) Assignee: Infineon Technologies AG, Munich (DE)

( * ) Notice: Subject to any disclaimer, the term of this patent is extended or adjusted under 35 U.S.C. 154(b) by 1010 days.

(21) Appl. No.: 09/820,449

(22) Filed: Mar. 29, 2001

(65) Prior Publication Data

US 2002/0141410 A1 Oct. 3, 2002

(51) Int. Cl.
*H04Q 11/00* (2006.01)

(52) U.S. Cl. .................. 370/382; 370/392; 710/52; 711/170

(58) Field of Classification Search ........ 370/412, 370/392, 382; 711/170, 171, 173, 154; 710/52, 710/56
See application file for complete search history.

(56) References Cited

U.S. PATENT DOCUMENTS

| | | | | |
|---|---|---|---|---|
| 5,426,424 A | * | 6/1995 | Vanden Heuvel et al. | 340/7.52 |
| 5,475,383 A | * | 12/1995 | Ohta et al. | 370/382 |
| 5,651,002 A | | 7/1997 | Van Seters et al. | |
| 5,784,698 A | * | 7/1998 | Brady et al. | 711/171 |
| 5,970,069 A | * | 10/1999 | Kumar et al. | 370/402 |
| 6,021,132 A | * | 2/2000 | Muller et al. | 370/412 |
| 6,088,777 A | * | 7/2000 | Sorber | 711/171 |
| 6,246,682 B1 | * | 6/2001 | Roy et al. | 370/390 |
| 6,421,769 B1 | * | 7/2002 | Teitenberg et al. | 711/170 |
| 6,487,202 B1 | * | 11/2002 | Klausmeier et al. | 370/395.1 |
| 6,604,147 B1 | * | 8/2003 | Woo | 709/240 |
| 6,622,183 B1 | * | 9/2003 | Holm | 710/34 |
| 6,694,388 B1 | * | 2/2004 | Schzukin et al. | 710/52 |
| 6,697,366 B1 | * | 2/2004 | Kim | 370/392 |
| 6,754,742 B1 | * | 6/2004 | Alowersson et al. | 710/53 |
| 2002/0029327 A1 | * | 3/2002 | Roth | 711/217 |

FOREIGN PATENT DOCUMENTS

| | | |
|---|---|---|
| DE | 31 14 734 C 2 | 10/1982 |
| WO | WO 99/00939 | 1/1999 |

\* cited by examiner

*Primary Examiner*—Steven Nguyen
*Assistant Examiner*—Clemence Han
(74) *Attorney, Agent, or Firm*—Welsh & Katz, Ltd.

(57) ABSTRACT

Data transmission memory (1) for the transmission of data packets between subscribers T with a pointer address memory (2) for storing chained subscriber-pointer address lists, comprising pointer addresses, for each subscriber; a plurality of subscriber state registers (12), which in each case store the state of an associated subscriber-pointer address list; a data memory (3) for storing data blocks which can be addressed by the pointer addresses; and with a memory controller (4) for controlling the pointer address memory (2) and the data memory (3).

18 Claims, 3 Drawing Sheets

DATA TRANSMISSION MEMORY

FIELD OF THE INVENTION

The invention relates to a data transmission memory and to a method of controlling it for the transmission of data packets between a plurality of subscribers.

BACKGROUND OF THE INVENTION

FIG. 1 shows a data transmission memory according to the prior art. This conventional data transmission memory serves for data transmission between various subscribers T1–T8. The data transmission memory is, for example, a SRAM, which is relatively slow on account of its size. The data transmission memory is connected to the subscribers T1–T8 via data buses. The data transmission memory is in this case either integrated in an independent bus switching device or itself forms part of a subscriber T. Each of the subscribers T1–T8 represented in FIG. 1 may, however, likewise have a corresponding data transmission memory as a link with further subscribers T. The data transmission memory contains a memory controller, which is connected to a data memory via internal data and control lines. The data memory integrated in the data transmission memory is a RAM, which is subdivided into various memory areas or buffer 1 to buffer 8. The number of memory areas of the data memory corresponds to the number of subscribers T1–T8 connected to the data transmission memory. In this case, the size of the memory areas, i.e. buffer 1 to buffer 8, is the same in each case. A buffer memory i serves in this case for the transmission of data packets to the destination subscriber $T_i$. The data buses are, for example, Ethernet data buses. In the data transmission memory, all the input data packets intended for a specific subscriber $T_i$ are buffer-stored in the associated buffer memory i, combined to form an output data packet and sent to the destination subscriber $T_i$ via the output data bus.

The customary data transmission memory represented in FIG. 1 has a number of considerable disadvantages. If, in a special situation of the overall system, a destination subscriber receives a large number of data packets from other subscribers, it may happen that the buffer memory i allocated to said subscriber within the data memory overflows and consequently none of its own data packets can be stored any longer in the buffer memory i. In this case, the overflowing of the corresponding buffer memory is detected by the memory controller, the data transmission is stopped and the entire system is initialized. This takes place even if there is still sufficient memory space available in the other buffer memories of the other subscribers T for receiving reception data packets. Since each subscriber is allocated an independent buffer memory area in a fixed way, the conventional data transmission memory according to the prior art, represented in FIG. 1, cannot respond flexibly to an overflow of the buffer memory, for example by making memory space available in the other, unused buffer memories. The conventional data transmission memory according to the prior art consequently responds inflexibly to load peaks affecting specific destination subscribers and is very slow.

A further disadvantage of the data transmission memory according to the prior art represented in FIG. 1 is that the data memory is utilized relatively poorly. In many situations, there happen to be only few subscribers T of the overall system communicating with one another via the data buses. It is accordingly also the case that only the buffer memory areas of these subscribers within the data memory are being used, while the other buffer memories of the other subscribers within the data memory are not being accessed at all or, only to a very small extent. If, for example, only the subscriber $T_1$ and the subscriber $T_8$ are exchanging data packets with each other via the data buses, only the buffer memory 1 and the buffer memory 8 are being used within the data memory, so that the maximum utilization of the data memory in this situation is at most 25%.

BRIEF SUMMARY OF THE INVENTION

If each subscriber T is provided with a data transmission memory of its own, the utilization of these memories is likewise low and a technically complex memory controller is required.

It is therefore the object of the present invention to provide a data transmission memory and a method of controlling it in which the memory space is optimally utilized and which operates very quickly.

This object is achieved according to the invention by a control method with the features specified in the patent claim 1 and by a data transmission memory with the features specified in patent claim 17.

The invention provides a method of controlling a data transmission memory for the transmission of data packets between subscribers in which a chained subscriber-pointer address list with address pointers for addressing data memory blocks of a data memory is stored for each subscriber in a pointer address memory.

In this case, each data memory block preferably comprises a plurality of data memory cells.

In a preferred embodiment, the number of data memory cells contained in a data memory block corresponds to the number of subscribers connected to the data transmission memory.

In a further preferred embodiment of the method according to the invention, in a reception operating mode, reception data packets are received from various source subscribers via a reception data bus and are stored in data memory cells of a data memory block.

In a further preferred embodiment of the method according to the invention, in a transmission operating mode, output data packets are in each case read out from a data memory block and sent to the associated destination subscriber via an output data bus.

The reception data packets in this case preferably have destination information data for identifying that destination subscriber for which the reception data packet is intended.

The memory size of a data memory cell in this case preferably corresponds to the size of an input data packet and the memory size of a data memory block preferably corresponds to the size of an output data packet.

In a particularly preferred embodiment of the method according to the invention, the state of each chained subscriber-pointer address list is stored in an associated state register.

In the subscriber state register, preferably a beginning address pointer to the first data block, an end address pointer to the last data block, the number of data memory blocks and the filling level of the last data block are stored.

The free pointer addresses within the pointer address memory are preferably stored in a free pointer address list of their own.

In the reception operating mode, preferably the last received reception data packet is written according to the stored filling state into the next free memory cell of the last data memory block of the destination subscriber, identified by the reception data packet.

After the reception data packet has been written into the last data memory block of the destination subscriber, the filling state is preferably incremented in the associated state register.

In a further preferred embodiment of the method according to the invention, the chained subscriber-pointer address list of the destination subscriber is extended by adding a chained address pointer for the addressing of a further data memory block if all the memory cells of the last data memory block of the destination subscriber are filled after the writing operation.

In a further preferred embodiment of the method according to the invention, in the transmission operating mode, the first data memory block of the destination subscriber is sent as an output data packet.

In this case, after the first data block has been sent, the chained subscriber-pointer address list of the destination subscriber is shortened by removing the beginning address pointer, pointing to the first data block.

In a preferred embodiment, the reception operating mode for writing reception data packets into the data transmission memory has priority over the transmission operating mode for sending output data packets from the data transmission memory.

The invention also provides a data transmission memory for the transmission of data packets between subscribers, with a pointer address memory for storing chained subscriber-pointer address lists, comprising pointer addresses, for each subscriber; a plurality of subscriber state registers, which in each case store the state of an associated subscriber-pointer address list; a data memory for storing data blocks which can be addressed by the pointer addresses; and with a memory controller for controlling the pointer address memory and the data memory.

The data memory is in this case preferably a SRAM.

The pointer address memory is preferably likewise a SRAM, since this can be produced at the lowest cost.

In a preferred embodiment of the data transmission memory according to the invention, the latter is connected to a plurality of source subscribers via a reception data bus and to a plurality of destination subscribers via a transmission data bus.

The transmission data bus and reception data bus are preferably bidirectional data transmission buses.

In a particularly preferred embodiment, the transmission data bus and reception data bus are Ethernet buses.

One advantage of the data transmission memory according to the invention and of the method of controlling it is that the overflowing of the data memory only takes place when the entire data memory, i.e. all the memory cells of the data memory, are filled.

A further advantage of the data transmission memory according to the invention and of the method of controlling it is that the memory access to the data memory by means of chained address pointers is very fast and consequently a very high data transmission rate is achieved.

In the text which follows, a preferred embodiment of the data transmission memory according to the invention and of the method of controlling it according to the invention is described with reference to the attached figures for explaining features essential for the invention.

DETAILED DESCRIPTION OF THE ILLUSTRATIVE EMBODIMENT

Figure 1:
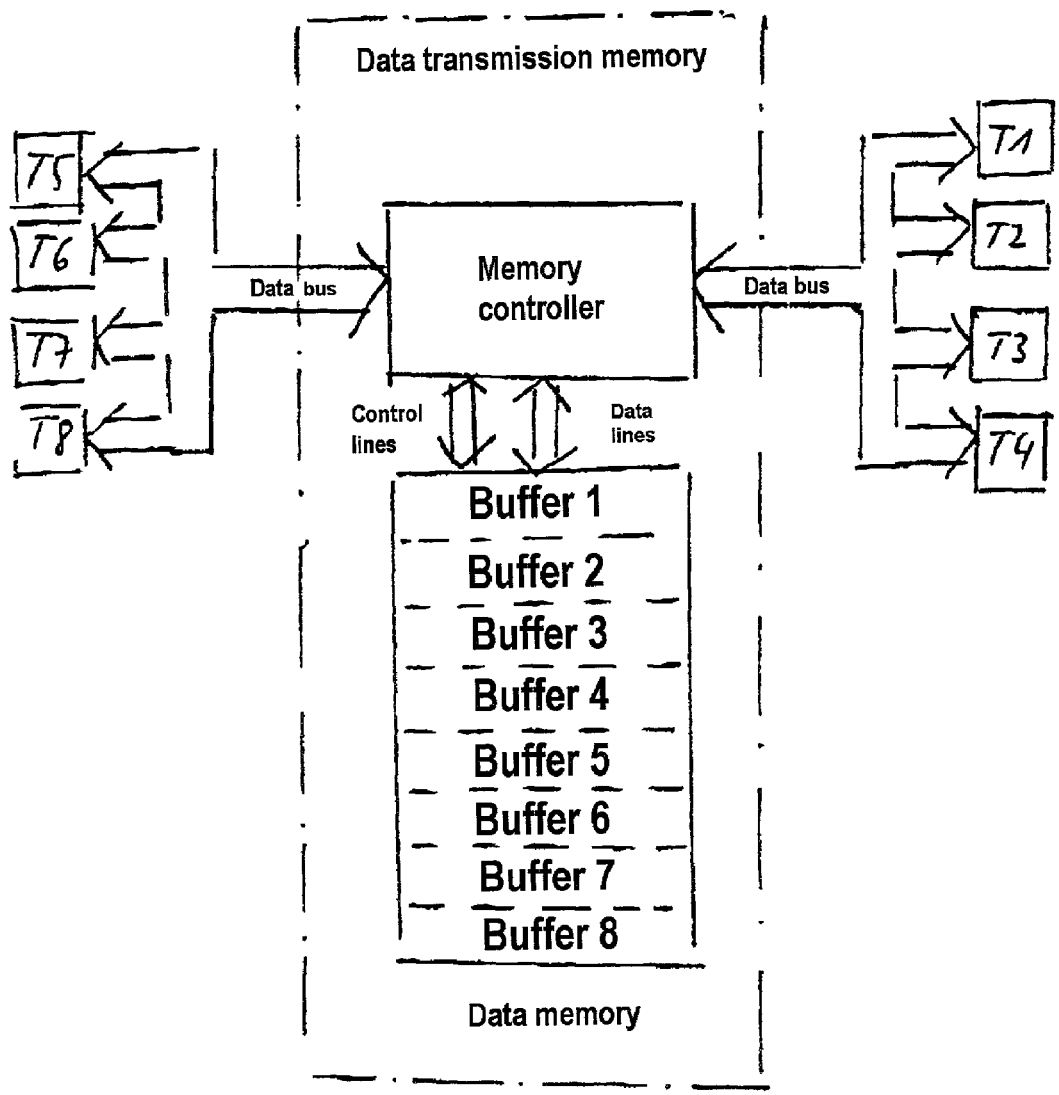
FIG. 1 shows a data transmission memory according to the prior art.

While the present invention is susceptible of embodiment in various forms, there is shown in the drawings a number of presently preferred embodiments that are discussed in greater detail hereafter. It should be understood that the present disclosure is to be considered as an exemplification of the present invention, and is not intended to limit the invention to the specific embodiments illustrated. It should be further understood that the title of this section of this application ("detailed Description of the Illustrative Embodiment") relates to a requirement of the United States Patent Office, and should not be found to limit the subject matter disclosed herein.

Figure 2:
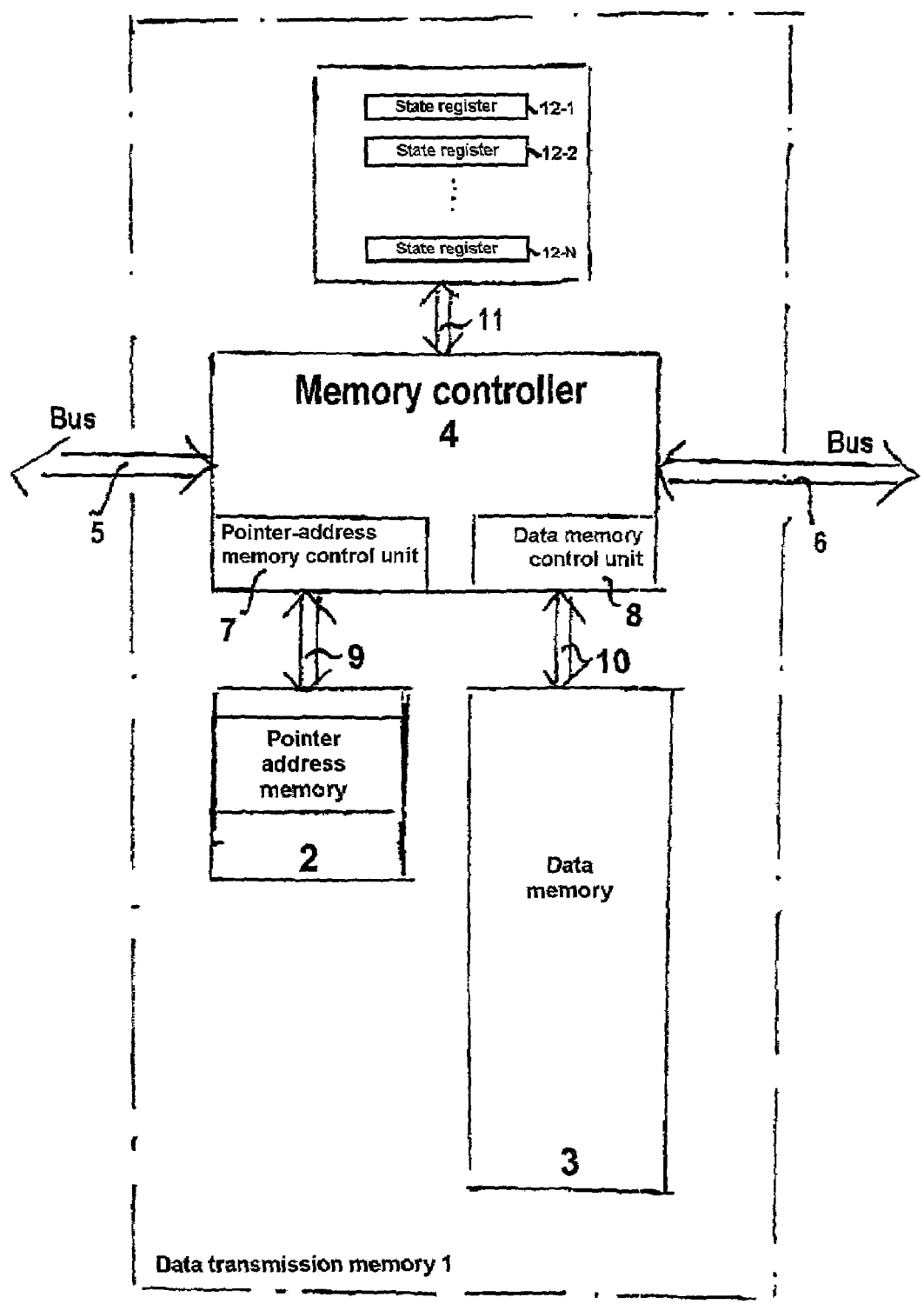
FIG. 2 shows a preferred embodiment of the data transmission memory according to the invention.

As represented in FIG. 2, the data transmission memory 1 according to the invention has a pointer address memory 2 and a data memory 3. Furthermore, the data transmission memory 1 contains a memory controller 4, which is connected to a first data bus 5 and a second data bus 6. The memory controller 4 contains a pointer-address memory control unit 7 and a data memory control unit 8. The pointer-address memory control unit 7 is connected to the pointer address memory 2 via data and control lines 9. The data memory 3 is connected to the data memory control unit 8 via data and control lines 10. In addition, the memory controller 4 is connected via data control lines 11 to state registers 12-1 to 12-N for storing the state of chained subscriber-pointer address lists within the pointer address memory 2. The memory controller is connected via the data buses 5, 6 to subscribers or subscriber terminals which communicate with one another. For this purpose, source subscribers send data packets to destination subscribers. The memory controller 4 receives the data packets to be transmitted as an input data packet via one of the data buses 5, 6. In the reception data packets there are destination information data for identifying that destination subscriber for which the reception data packet is intended. The memory controller 4 switches over between a reception operating mode and a transmission operating mode. In the reception operating mode, the reception data packets are stored in memory cells of the data memory 3. In the transmission operating mode, the data transmission memory 1 transmits an output data packet by transmitting the content of entire data blocks within the data memory 3 to the destination subscriber. The pointer address memory 2 and the data memory 3 are preferably SRAMs. The data buses 5, 6 are preferably Ethernet buses.

Figure 3:
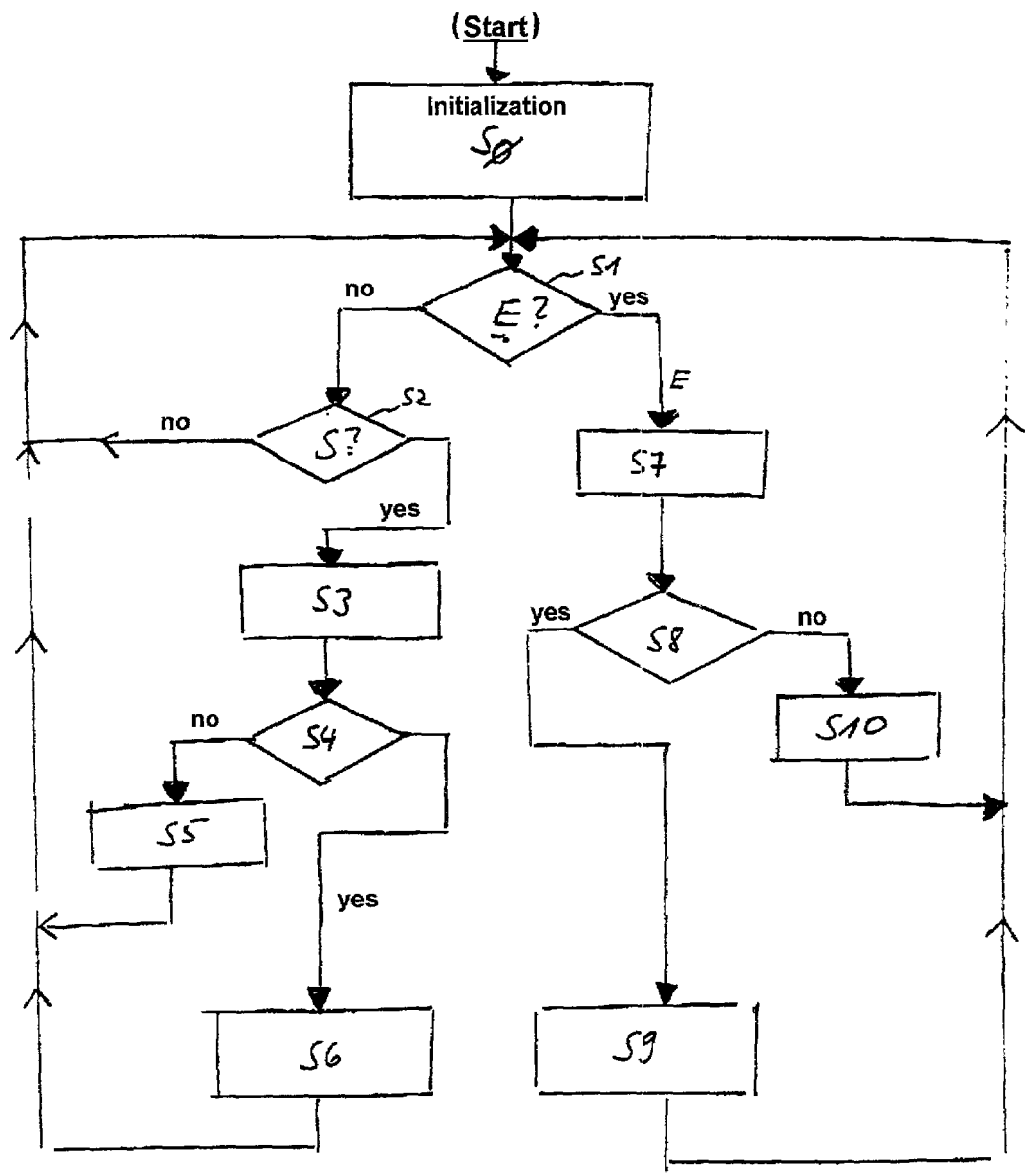
FIG. 3 shows a preferred embodiment of the control method according to the invention for controlling the data transmission memory represented in FIG. 2.

FIG. 3 represents the method according to the invention of controlling the data transmission memory 1. After the start, an initialization is carried out in a step $S_0$, in which a subscriber-pointer address list is generated for each subscriber connected to the data transmission memory 1 and an initial state is stored in the associated state register 12-1 to 12-N.

In a step S1, it is checked whether a transmission operating mode S or a reception operating mode E is in effect. In the transmission operating mode S, the data transmission memory 1 transmits output data packets via the output data bus to destination subscribers. In the transmission operating mode S, output data packets are read out from the data memory 3. In the reception operating mode E, reception data packets are written into memory cells of the data memory 3. The size of the output data packets sent in the transmission operating mode S corresponds to the memory size of data blocks within the data memory 3. The data blocks in this case respectively comprise a plurality of memory cells. The size of the memory cells preferably corresponds to the size of the input data packets. In the transmission operating mode S, a read access to the data memory 3 takes place, while in the reception operating mode E a write access to the data memory 3 takes place.

If it is established in step S1 that no reception operating mode E is in effect, i.e. there is no write access to the data memory 3, it is checked in step S2 whether the data transmission memory 1 is in the transmission operating mode S, i.e. read access to the data memory 3 is to take place.

If it is established in step S2 that a transmission operating mode S is in effect, a data block is addressed in a step S3, by the beginning address pointer which is stored in the state register 12-i of the destination subscriber, for reading out an output data packet.

In a further step S4, it is checked whether the beginning address pointer and the end address pointer of the destination subscriber are the same or not.

If the beginning address pointer and the end address pointer of the subscriber-pointer address list of the destination subscriber are the same, the filling state in the associated state register of the destination subscriber is set to zero in step S5.

If, conversely, the beginning address pointer and the end address pointer are not the same, the chained subscriber-pointer address list of the destination subscriber is shortened in a step S6.

For describing the state of a subscriber-pointer address list, the associated state register 12-i of a subscriber i contains data fields for describing the state of the chained subscriber-pointer address list. For this purpose, within the state register 12-i, a beginning address pointer to the first data block within the data memory 3 is stored in a first data field, an end address pointer to the last data block within the data memory 3 is stored in a second data field, the number of data memory blocks is stored in a third data field and the filling level of the last data block is stored in a fourth data field.

Since, in the transmission mode S, a data block or an output data packet is read out from the data memory 3, the associated subscriber-pointer address list of the destination subscriber to which the output data packet has been sent must be shortened by removing the address pointer which is pointing to the sent data block. For this purpose, the data fields within the associated state register 12-i are assigned new data values. In this case, the next pointer address of the chained subscriber-pointer address list is written into the first data field as the new beginning address pointer. Furthermore, in step S6, the beginning address pointer of the destination subscriber is stored in the second data field as the end address pointer. Furthermore, in the chained list of free pointer addresses, the last-but-one free pointer address is given the value of the last free pointer address. After shortening the subscriber-pointer address list in step S6, the program sequence returns to step S1.

If it is established in step S1 that the reception operating mode E is in effect, the memory cell address of that memory cell within the data memory 3 into which the reception data packet is being written is calculated in step S7. The memory cell address is in this case dependent on the end address pointer to the last data block for the destination subscriber and on the associated filling state of the last data block. After the input data packet has been written into the addressed memory cell, it is checked in a step S8 whether the data block in which the addressed memory cell is located is now full due to the writing of the memory cell. If it is established in step S8 that the data block is now filled, the program sequence proceeds to step S9. In step S9, the subscriber-pointer address list of the destination subscriber which has received the last input data packet is extended by adding one address pointer for the addressing of a further data block within the data memory 3. For this purpose, in step S9, the filling state in the associated state register 12-i of the destination subscriber is set to zero and the number of data memory blocks is incremented. Furthermore, the beginning address pointer of the free pointer chain is stored in the third data field of the state register 12-i as the new end address pointer. The last-but-one address pointer of the destination subscriber is assigned the previous end address pointer of the destination subscriber as a new value. Furthermore, the beginning address pointer of the free pointer address list is allocated the next free address pointer. In step S9, the subscriber-pointer address list of the destination subscriber is consequently extended by adding a plurality of memory cells within the data memory 3 for the addressing of a further data block. After that, the method sequence returns to step S1.

If it is established in step S8 that, following the storing of the input data packet, the addressed memory cell of that data block in which the memory cell is located is not filled, the filling level of this last data block is incremented by 1 in step S10. After that, the method sequence returns to step S1.

As FIG. 3 reveals, the method according to the invention for controlling the data transmission memory 1 permits a dynamic data memory management by means of chained subscriber-pointer address lists for the various subscribers, with the chained subscriber-pointer address lists stored in the pointer address memory 2. Each chained subscriber-pointer address list has the data contents of the various data fields within the associated state register 12-i written to it. Each subscriber-pointer address list is in this case shortened or extended by one address-pointer chain link in accordance with the respective memory requirement of the destination subscriber. For every necessary additional data block for the data subscriber within the data memory 3, the subscriber-pointer address list is extended by one address pointer. If the memory requirement for a destination subscriber falls because of the sending of an output data package of a size corresponding to a data block within the data memory 3, the associated pointer address list of the destination subscriber is dynamically shortened by one address pointer link.

The flexible memory assignment of the data memory 3 even allows in an extreme case the entire data memory 3 to be occupied by input data packets for a single destination subscriber. This is particularly helpful in situations in which the destination subscriber receives a very large amount of data packets from the other subscribers. In such a situation, overflowing of the data memory 2 only takes place when all the memory cells are occupied with input data packets for the destination subscriber. Consequently, in the case of the control method according to the invention, the buffer memory for each destination subscriber can consequently be the size of the entire data memory 3.

The dynamic memory location assignment of the data memory 3 also achieves much higher memory utilization of the data memory 3. Since the addressing of the memory cells takes place by means of chained pointer address lists which point to the associated data block in which the memory cell is provided, the addressing time required by the memory controller 4 for addressing the memory cell is very small. As a result, very high data transmission rates can be achieved. The data transmission memory 1 represented in FIG. 2 is located either in a data transmission computer and/or within each subscriber. In a preferred embodiment, the data transmission memory 1 is connected to a transmission data bus for the reception of input data packets and to an output data bus for the sending of output data packets. In an alternative embodiment, the memory controller 4 is connected to a bidirectional data bus, via which the data packets are received and sent.

The data transmission memory 1 allows any desired data networks to be set up in a star or ring form. The data transmission memory 1 according to the invention is suitable in particular for connection to Ethernet buses. In a particularly preferred embodiment, the method sequence represented in FIG. 3 is wired or implemented by hardware in the memory controller 4. In a further preferred embodiment, the pointer address memory 2 and the data memory 3 are two separate memory areas within a SRAM.

The memory size of the pointer address memory 2 and of the data memory 3 depends on the number of transmission subscribers and the size of the data packet to be transmitted. The number of data memory cells contained in a data block depends on the size ratio between output data packets and input data packets. The size of the input data packets which are sent to the destination subscribers via the output data bus is generally greater than the size of the input data packets which the data transmission memory 1 receives via the input bus. For example, 8 input data packets which are sent by various source subscribers to the destination subscribers are combined on the data transmission memory 1 to form one output data packet.

What is claimed is:

1. A method of controlling a data transmission memory for the transmission of data packets between subscribers comprising the steps of storing, for each subscriber in a pointer address memory, a chained subscriber-pointer address list with address pointers for addressing data memory blocks of a data memory, wherein each said data memory block comprises a plurality of data memory cells; and storing said subscriber-pointer address list, a beginning address pointer to the last memory block, the number of data memory blocks and a filling level of the last data memory block in a subscriber state register; and said controlling the transmission of data packets between the subcribers based on stored information in the memory.

2. The method as claimed in claim 1, in which, in a reception operating mode, reception data packets are received from various source subscribers via a reception data bus and are stored in data memory cells of a data memory block addressed by the subscriber-pointer address list.

3. The method as claimed in claim 2, in which each reception data packet contains destination information data for identifying a destination subscriber for which the reception data packet is intended.

4. The method as claimed in claim 3, in which, in the reception operating mode, a last received reception data packet is written according to a stored filling state into a next free memory cell of a last data memory block of the destination subscriber, identified by the reception data packet.

5. The method as claimed in claim 4, in which, after the reception data packet has been written into the last data memory block of the destination subscriber, a filing state is incremented in a associated state register.

6. The method as claimed in claim 1, in which, in a transmission operating mode, output data packets are in each case read out from a data memory block and sent to an associated destination subscriber via an output data bus.

7. The method as claimed in claim 1, in which a memory size of a data memory cell corresponds to the size of an input data packet and a memory size of a data memory block preferably corresponds to the size of an output data packet.

8. The method as claimed in claim 1, in which a pointer address list of the free pointer addresses is stored in the pointer address memory, so that the pointer address memory forms a reproduction of the data memory.

9. The method as claimed in claim 1, in which the chained subscriber-pointer address list is extended by adding a chained address pointer for addressing a further data memory block if all memory cells of a last data memory block of the destination subscriber are filled after a writing operation.

10. The method as claimed in claim 1, in which, in a transmission operating mode, a first data memory block of the destination subscriber is sent as an output data packet.

11. The method as claimed in claim 10, in which, after the first memory data block has been sent, the chained subscriber-pointer address list is shortened by removing a beginning address pointer, pointing to the first data block.

12. The method as claimed in claim 1, in which a reception operating mode for writing reception data packets into the data transmission memory has priority over a transmission operating mode for sending output data packets from the data transmission memory.

13. A data transmission memory for the transmission of data packets between subscribers with a pointer address memory for storing chained subscriber-pointer address lists, comprising pointer addresses, for each subscriber; a plurality of subscriber state registers, which store the state of an associated subscriber-pointer address list; a data memory for storing data blocks which can be addressed by the pointer addresses; and with a memory controller for controlling the pointer address memory the data memory, a beginning address pointer to the last memory block, the number of data memory blocks and a filling level of the last data memory block in a subscriber state register.

14. The data transmission memory as claimed in claim 13, wherein the data memory is a SRAM.

15. The data transmission memory as claimed in claim 13, wherein the pointer address memory is an SRAM.

16. The data transmission memory as claimed in claim 13, wherein the memory controller is connected to source subscribers via a reception data bus and to subscribers via a transmission data bus.

17. The data transmission memory as claimed in claim 16, wherein the transmission data bus and reception data bus are bidirectional buses for bidirectional data transmission.

18. The data transmission memory as claimed in claim 17, wherein the transmission data bus and reception data bus are Ethernet buses.

* * * * *